Figure 1:
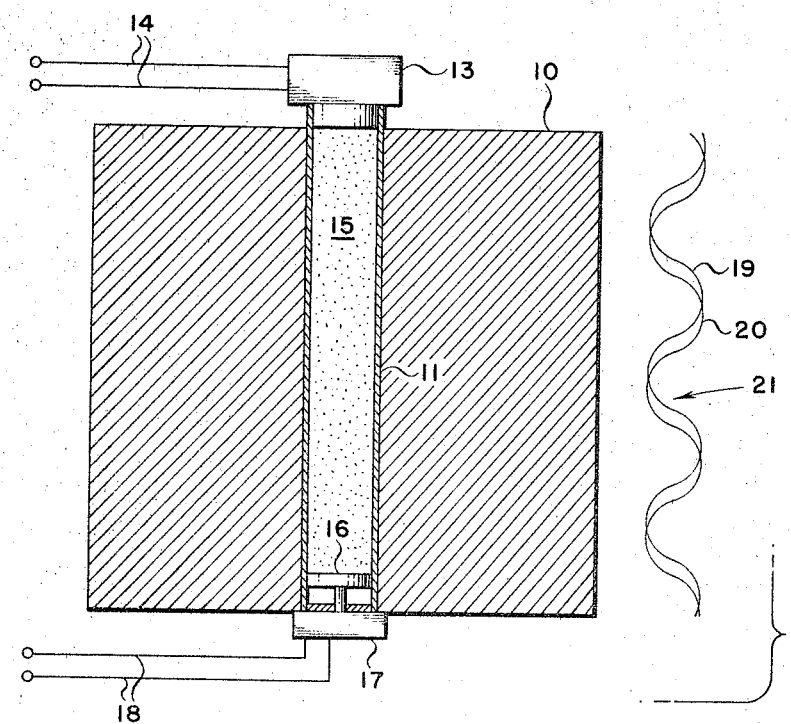

March 14, 1967 C. M. BENNETT 3,309,284
METHOD AND MEANS FOR CONTROLLING REACTIVITY
WITHIN A NUCLEAR REACTOR
Filed March 16, 1965

INVENTOR.
CHESTER M. BENNETT
BY
George C. Sullivan
Agent

United States Patent Office 3,309,284
Patented Mar. 14, 1967

3,309,284
METHOD AND MEANS FOR CONTROLLING RE-ACTIVITY WITHIN A NUCLEAR REACTOR
Chester M. Bennett, Mountain View, Calif., assignor to Lockheed Aircraft Corporation, Burbank, Calif.
Filed Mar. 16, 1965, Ser. No. 440,156
10 Claims. (Cl. 176—86)

This invention relates to techniques for controlling the reactivity within nuclear reactors, and more particularly to a method as well as a means to control such reactivity that is predicated on the use of compressional waves to vary the neutron absorption capacity in the core of the reactor by altering the characteristics of the absorbing element.

Heretofore the reactivity of nuclear reactors has been generally regulated by solid state control rods fabricated of neutron absorbing material. Thus, control rods have been disposed in the core of the reactor and reciprocated usually by mechanical means whereby the area of such rod exposed to neutrons in the reactor is altered establishing a corresponding neutron absorption and flux level therein.

The principal objection to this conventional method and means lies in the fact that the thermal neutron flux of the reactor is low in the direction of the control rod and where it traverses and high in the reactor areas remote from the control rod. Uniform neutron flux distribution throughout the reactor has not been achieved through the use of these control rods with the result that irregular temperatures develop and overheating of some areas occurs. Also, non-uniform fission distributions occur resulting in higher fuel burn-up rates in these areas. This has the detrimental effect of undue wear to portions of the reactor reducing its operational efficiency and life span.

The instant invention proposes to overcome the foregoing and other shortcomings of the existing practice by a method whereby compressional waves are produced in the core of a nuclear reactor where they are employed to vary the absorption characteristics thereof. In contrast to the prior method where neutron absorption in the reactor is localized, i.e., is limited to and depends upon the length of the control rod projecting into the reactor, neutron absorption by the present method occurs throughout the entire dimension of the reactor. In short, the absorption capacity in the core is altered by varying its inherent absorbing characteristics and not by the adjustment of its position, as in the past.

The means herein contemplated to accomplish the proposed method include a control column mounted within the reactor and adapted to contain a neutron absorptive substance, commonly known to the art as neutron poison material. This material whether in liquid, gaseous or solid form is of preselected quantity and composition matched to the volume of the column to be compressible therein.

At one of its ends the control column is closed by sound generating means which may be in the form of an electromechanical transducer located externally of the reactor. At its other end the column is closed by a sound reflector whereby a compressional wave induced in the column by the transducer is reflected. By changing the effective distance between the transducer and the reflector, the relative phase of the incident and reflected wave trains within the column is varied to distribute the poison material therein accordingly. The absorption characteristics of the control column may thereby be changed or regulated between the extremes of neutron opaque for maximum absorption and alternately neutron opaque and neutron transparent for minimum absorption.

Thus, the absorption capacity of the control column herein contemplated may be varied to control the flux activity across the entire dimension of the reactor. An appreciably greater uniformity of the neutron flux distribution within the reactor is obtained than heretofore and the neutron and thermal problems of prior art control rods are avoided.

Figure 2:
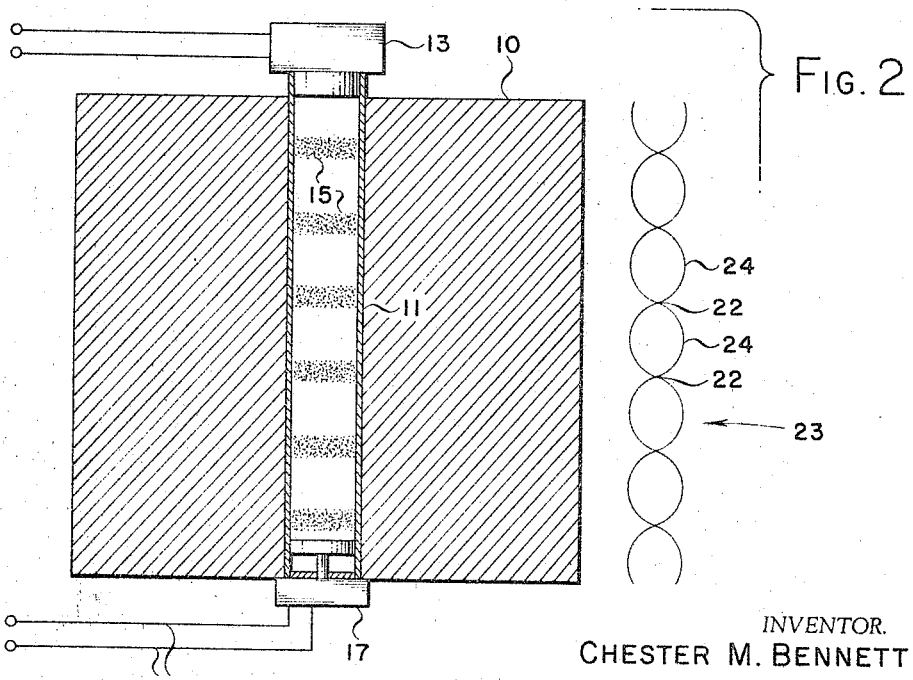

With the above and other objects in view as will be apparent, this invention consists in the method as well as the construction, combination and arrangement of parts all as hereinafter more fully described, claimed and illustrated in the accompanying drawings wherein:

FIGURE 1 is a schematic view of a nuclear reactor incorporating control means as herein proposed for varying the neutron absorption capacity in the core thereof, said means being shown in the neutron opaque or maximum absorption condition as indicated graphically by the relative phase of the incident and reflected waves therein; and FIGURE 2 is a similar view showing the control means in the combination neutron opaque and neutron transparent or minimum neutron absorption condition as indicated graphically by the corresponding relative phase of the incident and reflected waves therein.

Referring with greater particularity to the drawings, 10 designates a nuclear reactor in which control means constructed in accordance with the teachings of this invention is adapted to be disposed. To this end, a hollow cylindrical control column 11 is mounted in a fixed position within the core of the reactor 10 being substantially coextensive with one dimension thereof. One end 12 of the column 11 extends beyond the wall of the reactor 10 and is closed by a sound generator preferably an ultrasonic pressure transducer 13 capable of creating pressure waves in the column 11 of a selected wave shape and having frequency components in a predetermined range. The transducer 13 is connected to a suitable source of energy through leads 14 following conventional practice.

The control column 11 is filled with a neutron poison material 15 which may be in powdered, gaseous or liquid form, the quantity and composition of such material being matched to the volume of the column 11 to permit predetermined compressibility thereof for reasons to become more apparent. Any neutron poison material, such as boron, hafnium, cadmium, samarium or the like which is highly absorptive of thermal neutrons as well as any combination of such materials, for example powdered boron carbide, may be employed.

The control column 11 is fabricated of a non-neutron absorptive material having low acoustical impedance in relation to the transmitting medium, i.e., the neutron poison material 15, such as aluminum, stainless steel or the like. The column 11 is closed and sealed at its other end adjacent the opposite wall of the reactor 10 by a transverse closure 16 of a material, preferably steel or the like, having high acoustical impedance in relation to the poison material 15, so as to act as a sound reflector. This reflector 16 is adjustably mounted in any conventional manner in the end of the column 11 for lineal movement being connected in appropriate manner to a drive 17 adapted for connection to a suitable power source through leads 18.

In operation, upon energization of the transducer 13, sinusoidal compressional waves are produced thereby which are propagated from one end to the other of the control column 11 through the neutron poison material 15 where they are reflected by the closure 16 to form an incident wave train 19 and a reflected wave train 20 in the control column 11. When the incident and reflected wave trains 19 and 20 are not in harmonic resonance, a continuous wave 21 is formed and the neutron poison material 15 is substantially equally distributed throughout the length of the control column 11.

When, however, the reflected and incident waves 19 and 20 are in harmonic resonance, 180° out of phase with each other at the nodes 22, the resultant wave will be a standing wave 23. In this case the poison material 15 will be concentrated at the nodes 22 of the standing wave 23 and voids will be created therebetween, i.e., at the antinodes 24. The absence of material at the antinodes 24 permits neutrons to pass through the column 11 without being absorbed. Thus the probability of neutron absorption is appreciably reduced in the standing wave condition as compared with the continuous wave condition.

The phase relationship of the incident and reflected waves 19 and 20 in the column 11 is selectively adjusted by manipulation of the reflector 16 through operation of the drive 17. Thus, the effective length of the control column 11 is altered. When this length is a multiple of half a wavelength of the compressional wave, the incident and reflected wave trains 19 and 20 will be 180° out of phase at the nodes 22 and in phase at the antinodes producing the standing wave 23. When this length is other than a multiple of half a wavelength of the compressional wave, the incident and reflected wave trains 19 and 20 will produce the continuous wave 21.

While the adjustment of the reflector 16 as indicated above is a method of regulating the absorption characteristics of the column 11, the same effect may be obtained by securing the reflector 16 in a fixed position and changing the frequency of the compressional wave by corrective operation of the transducer 13. Such transducers are known to the art being of the type for example described in United States Letters Patent 3,033,027, issued to Perls et al., on May 8, 1962.

It is particularly noted that in the foregoing operation thermal neutrons are virtually entirely absorbed near the surface of the material 15, i.e., the amount of absorption approximates 100 percent and is considered black. A higher concentration of the material 15 at the nodes 22 of the standing wave 23 is therefore not considered blacker for thermal neutrons. The complete absence of this material 15 at the antinodes 24 will result in substantially zero or no absorption of thermal neutrons at these points.

Moreover, in the standing wave condition, the distribution of poison material 15 will vary in density along its length. The nodal points 22 of maximum concentration will possess a narrow width with respect to the antinodal points 24 by a ratio of approximately 1 to 10 for a standing wave 23 of relatively large amplitude. Consequently, the formation of a standing wave 23 within the column 11 is substantially equivalent to its withdrawal from the reactor 10. In this respect the effect of the herein proposed control device is not unlike that of the prior control rod.

From the foregoing it should become apparent that the underlying method of this invention consists in placing a column of neutron poison material in the core of a nuclear reactor, closing one end of the column with a sound reflector, and subjecting the material thus disposed to compressional waves of selected wavelength applied at the other end of the column whereby the incident and reflected waves thus induced in the column have predetermined phase relations. The inherent neutron absorptive characteristics of the column is thereby varied resulting in corresponding changes in its absorption capacity. Hence the reactivity within the reactor may be controlled.

While a particular embodiment of the invention has been hereinabove illustrated and described, it will be readily apparent to those skilled in the art that various changes and modifications may be made without departing from the spirit and scope of the invention as set forth in the appended claims.

What is claimed is:

1. The method for controlling the reactivity within a nuclear reactor consisting of placing a column of compressible neutron absorbing substance in the core of the reactor, producing a compressional wave of preselected wavelength at one end of said column, reflecting said compressional wave at the other end of said column, and varying the wavelength of said compressional wave.

2. The method of claim 1 wherein said column substantially traverses one dimension of said reactor.

3. The method of claim 1 wherein said compressional wave is produced by an application of ultrasonic pressure.

4. The method of claim 1 wherein said wavelength is varied by altering the location at said other end where said compressional wave is reflected.

5. The method of claim 3 wherein said wavelength is varied by altering the pressure applied as aforesaid.

6. Means for controlling reactivity within a nuclear reactor comprising: a control column adapted to be mounted within the reactor; a neutron absorbing substance in said column; pressure generating means at one end of said column operative to produce a compressional wave therein; a reflector at the other end of said column to reflect said compressional wave whereby incident and reflected wave trains are produced in said column; and means to vary the relative phase of said incident and reflected wave trains.

7. The means of claim 6 wherein said control column is of a length substantially equal to one dimension of said reactor whereby to traverse same when mounted therein as aforesaid.

8. The means of claim 6 wherein said control column and said reflector respectively are fabricated of a material having a low and a high acoustical impedance in relation to said neutron absorbing substance.

9. The means of claim 6 wherein said pressure generating means is an electromechanical transducer located externally of said reactor.

10. The means of claim 6 wherein said last recited means includes a drive associated with said reflector and operative to move it linearly of said column.

References Cited by the Examiner

UNITED STATES PATENTS 3,025,228  3/1962  Whitelaw _____ 176—86

FOREIGN PATENTS 114,151  3/1942  Australia.
1,371,506  7/1964  France.
897,884  5/1962  Great Britain.

CARL D. QUARFORTH, *Primary Examiner.*

L. DEWAYNE RUTLEDGE, *Examiner.*

H. E. BEHREND, *Assistant Examiner.*